(12) United States Patent
Lee et al.

(10) Patent No.: US 10,120,873 B2
(45) Date of Patent: *Nov. 6, 2018

(54) SURVIVABLE CLOUD DATA STORAGE AND TRANSPORT

(71) Applicant: SPATIAL DIGITAL SYSTEMS, INC., Agoura Hills, CA (US)

(72) Inventors: Juo-Yu Lee, Westlake Village, CA (US); Donald C.D. Chang, Thousand Oaks, CA (US); Steve K. Chen, Pacific Palisades, CA (US)

(73) Assignee: SPATIAL DIGITAL SYSTEMS, INC., Agoura Hills, CA (US)

(*) Notice: Subject to any disclaimer, the term of this patent is extended or adjusted under 35 U.S.C. 154(b) by 489 days.

This patent is subject to a terminal disclaimer.

(21) Appl. No.: 14/712,145

(22) Filed: May 14, 2015

(65) Prior Publication Data

US 2015/0248431 A1 Sep. 3, 2015

(51) Int. Cl.
*G06F 17/30* (2006.01)
*G06F 21/62* (2013.01)

(52) U.S. Cl.
CPC .. *G06F 17/30153* (2013.01); *G06F 17/30138* (2013.01); *G06F 21/6209* (2013.01)

(58) Field of Classification Search
CPC ........... G06F 17/30598; G06F 21/6209; G06F 17/30153
See application file for complete search history.

(56) References Cited

U.S. PATENT DOCUMENTS

| 6,275,990 B1 * | 8/2001 | Dapper | G06F 17/14 348/E7.07 |
| 2006/0280259 A1 * | 12/2006 | Alon | H04L 1/0033 375/295 |

(Continued)

*Primary Examiner* — Alexander Khong
(74) *Attorney, Agent, or Firm* — Phuong-Quan Hoang

(57) ABSTRACT

Presented is a multi-channel data process to utilize wavefront multiplexing for data storage and data stream transport with redundancy on cloud or in a distribution network. This processing features additional applications for multi-media recording and data communications via transponding platforms including satellites, unmanned air vehicles (UAVs), or others for better survivability and faster accessing. Multiple concurrent data streams are pre-processed by a wavefront multiplexer into multiple sub-channels or wavefront components, where signals from respective data streams are replicated into sub-channels. These replicated data streams are linked via a unique complex weighting vector (amplitude and phase or their equivalents), or "wave-front", which are also linked by various spatially independent wavefronts. Additionally, probing data streams are embedded and linked via some of the independent wavefronts. Aggregated data streams in sub-channels are unique linear combinations of all input data streams. Generating redundancy for stored or transported data are options in the WF muxing process. Post-processing via a wavefront de-multiplexer converts various sub-channel data streams back to the original data streams, utilizing the embedded known priori data streams as additional knowledge for reducing degrees of freedom to restore orthogonality or independency among multiple wavefronts.

16 Claims, 10 Drawing Sheets

(56) References Cited

U.S. PATENT DOCUMENTS

2007/0238420 A1* 10/2007 Legouable ............ H04L 1/0625
455/101
2010/0332401 A1* 12/2010 Prahlad ............. G06F 17/30082
705/80
2011/0197740 A1* 8/2011 Chang .................... G10H 1/361
84/610

* cited by examiner

SURVIVABLE CLOUD DATA STORAGE AND TRANSPORT

CROSS REFERENCE TO RELATED PATENTS

This application claims the benefit of provisional application No. 62/033,627, entitled "Survivable Cloud Data Storage and Transport," filed on Aug. 5, 2014. This application is related to application Ser. No. 12/848,953, filed on Aug. 2, 2010; application Ser. No. 13/938,268, filed on Jul. 10, 2013; application Ser. No. 13/953,715, filed on Jul. 29, 2013.

BACKGROUND OF THE INVENTION

Presented is a multi-channel data process to utilize wavefront multiplexing (WF muxing) for data storage and data stream transport with redundancy on cloud or in a distribution network for enhanced data survivability and faster data access. This processing features additional applications for multi-media recording and data communications via transponding platforms including satellites, unmanned air vehicles (UAVs), and others. Multiple concurrent data streams are pre-processed by a wavefront multiplexer (WF muxer) into multiple sub-channels or wavefront components, where signals from respective data streams are replicated into sub-channels. These replicated data streams are linked via a unique complex weighting vector (amplitude and phase or their equivalents), or "wave-front", which are also linked by various spatially independent wavefronts. Additional input data streams including probing data streams, which are known priori to intended receivers, are embedded and linked via some of the independent wavefronts. Aggregated data streams in sub-channels are unique linear combinations of all input data streams. Generating redundancy for stored or transported data are options in the WF muxing process. Post-processing via a wavefront de-multiplexing (WF demuxing) device converts various sub-channel data streams back to the original data streams, utilizing the embedded probing data streams to restore orthogonality or independency among multiple wavefronts. With built-in redundancy options, the multichannel processing for storage and transport will feature better survivability as well as faster access, and will not need all but sufficient numbers of various sub-channel data streams in reconstituting original data streams.

Methods and apparatus are described in regard to survivability of data transport and storage on cloud via wavefront multiplexing and wavefront de-multiplexing. There are four important features; (1) back up data storage distributed on cloud, (2) customized shared redundancy for enhanced survivability, (3) remote accessibility via mobile devices, and (4) Data base on storage house-keeping information on the stored data sets such as formulations and parameters of WF muxing/demuxing, locations and file names of stored data on cloud, and other related information.

FIELD OF THE INVENTION

The present invention relates to methods and apparatus for provisioning of data survivability in distributed storage systems. It is also related to wavefront multiplexing/de-multiplexing (WF muxing/demuxing) technologies [1, 2].

The disclosure relates to methods, apparatus and the corresponding architectures of distributed data systems via WF muxing. It is focused on data survivability in user's storage devices and registered cloud space, and also provide benefits of data redundancy and storage reliability. The WF muxing techniques will use less memory space to achieve better redundancy, reliability, and survivability as compared to conventional techniques of processing and storing data in centralized storage space, in which the storage apparatus comprises identical or very similar devices. On the contrary, the WF muxing techniques may be applied to data processing and storage in distributed storage systems, in which the storage apparatus comprise heterogeneous devices. In addition, these techniques enable the capabilities of monitoring data integrity of stored data sets without scrutinizing the stored data sets themselves. The same techniques can be extended to data streaming via cloud.

DESCRIPTION OF THE PRIOR ART

The existing RAID (Redundant Array of Independent Disks) techniques have been prevailing as a class of data storage technologies that combine multiple identical or similar disk drive components into a logical unit. Data is distributed across the drives according to one of several "RAID levels", which refer to the required level of redundancy and performance. The techniques used to provide redundancy in a RAID array is through the use of mirroring or parity.

In a RAID system using mirroring, all data in the system is written simultaneously to two identical or similar hard disks instead of one. The main advantage of mirroring is that it provides not only complete redundancy of data, but also reasonably fast recovery from a disk failure. The chief disadvantage of mirroring is expense, for data duplication means a user must buy twice the capacity that the user wants to end up with in the array. Performance is also not as good as some other techniques.

Since a RAID array has many identical or similar drives, its mechanical components become performance-limiting factors that slowdown data positioning and transferring. An opportunity of improving performance benefits from using the hardware in all these drives in parallel. For example, it is much faster to have a large file chopped up into pieces, some of the pieces stored on each of the drives in an array, and then all the disks are used to read back the file when needed. This technique is called striping, namely "chopped up pieces" being stored on the various drives.

Data striping also often involves the use of parity information which is redundancy information calculated from the actual data values. The term "parity" refers to the operations of: taking "N" pieces of data, and computing an extra piece of data. Each piece is typically a block of bytes in data. For instance, one can take the "N+1" pieces of data and store them on "N+1" drives. If any one of the "N+1" pieces of data is lost, all pieces of data can be recovered from the "N" remaining drives, regardless of which piece is lost.

When parity protection is used with striping, the parity information can either be stored on a separate, dedicated drive, or be mixed with the data across all the identical or similar drives in the array.

The most obvious advantage is that parity protects data against any single drive failure in the array without requiring the 50% "waste" of mirroring, for only one of the "N+1" drives contains redundancy information. The overhead of parity is equal to $$\frac{100}{N}\%$$

where N is the total number of drives in the array. The main disadvantages of striping with parity relate to complexity: all those parity bytes have to be computed, which can be millions per second and thus consumes computing power.

Cloud storage refers to saving data to a storage system maintained by a third party. However, the two biggest concerns about cloud storage are reliability and protection. To store data reliably, most systems utilize redundant storage space comprising identical or similar disk drives. To protect data, most systems use a combination of techniques including encryption, authentication and authorization. The adoption of cloud storage also implies, however, less control of stored data on the user side.

This invention application addresses data survivability in distributed storage systems as well as reliability of stored data over user's storage devices and registered cloud space via WF muxing/demuxing methods and techniques. Since data will be preprocessed on the user side, each of the stored data in the distributed storage systems is a multiplexed (muxed) data set individually that is unintelligible by itself. Therefore, the proposed approaches shall remove the concerns on integrity confidence of operators, and those on the right of stored data. Embodiments of "writing" and "reading" processes will be presented. "Writing" features a process on multiple original segments of data concurrently via WF muxing transformations, generating WF muxed data to be stored on user's storage devices and registered cloud space. A "reading" process corresponds to a WF demuxing transformation on WF muxed data stored on cloud storage, reconstituting original segments of data and the entirety of data itself.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, with emphasis instead being placed on the principles of the disclosure. In the drawings.

DETAILED DESCRIPTION

Figure 1:
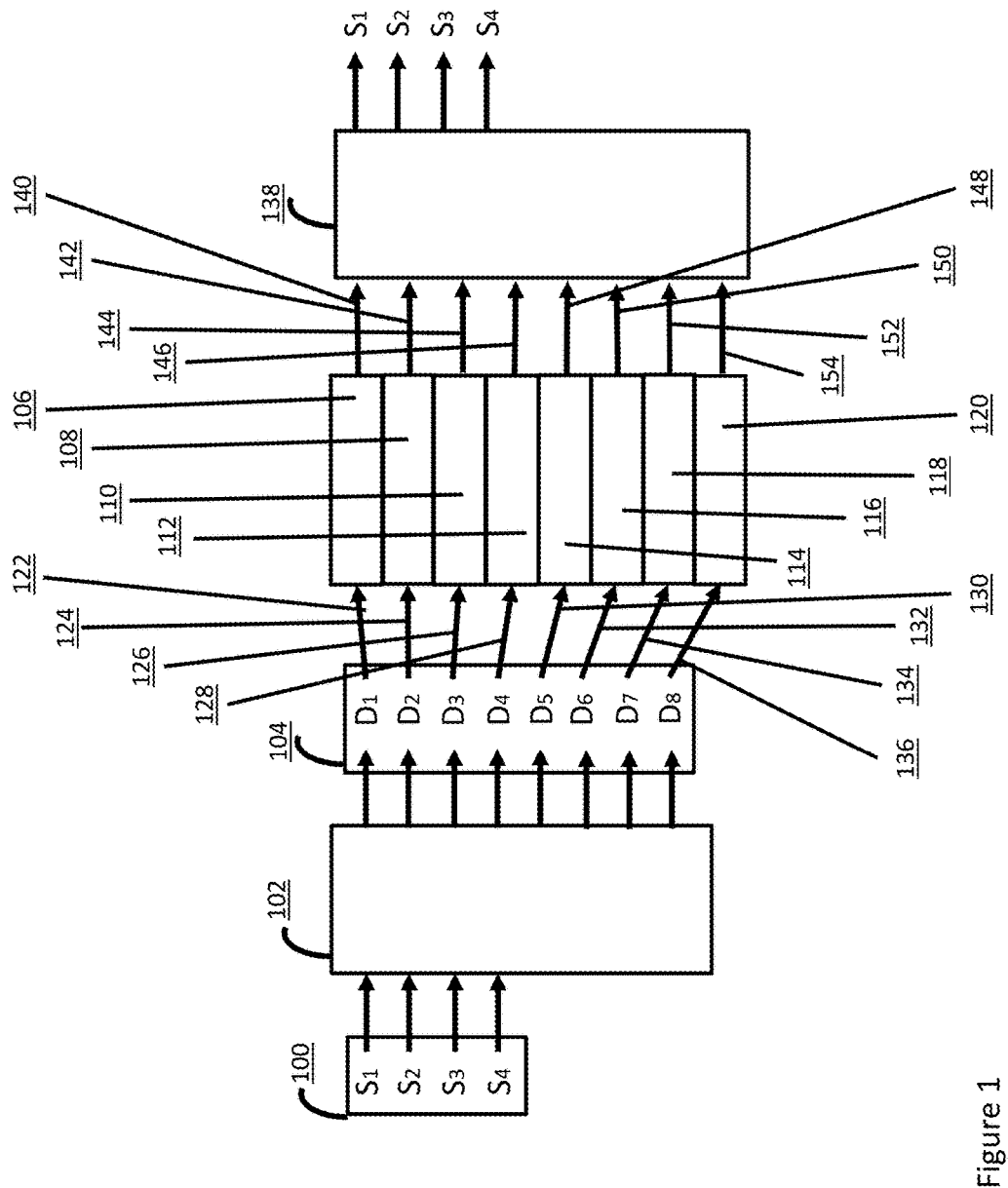
FIG. 1 depicts a block diagram on distributed data storage for 4 independent data sets of nearly identical data size via WF muxing and associated retrieval processing from multiple stored data sets via WF demuxing.

We may use the term "writing" to refer the act of storing data on cloud or sending data through cloud. We may also use the term "reading" to refer the act of retrieving data from cloud or receiving data through cloud.

The present invention relates to distributed data storages with built-in redundancy for a single stream data subdivided into M multiple data substreams or M independent data streams, converted into WF muxed domain with M+N output wavefront components (WFCs), and stored these M+N WFC output data into M+N separated data storage sets, where N, and M are integers and N>0. As a result, the stored data sets are WFCs in forms of linear combinations of the data sets, instead of the data sets themselves.

Let us use an example to illustrate the proposed procedures. A data set with 4 numerical data points $\underline{S}=[1, 2, 3, 4]$ will be stored in 8 memory sets through the following procedures: (1) segmenting $\underline{S}$ into 4 segments $S_1=1$, $S_2=2$, $S_3=3$ and $S_4=4$; (2) putting $S_1$, $S_2$, $S_3$ and $S_4$ through a WF muxing process based on 4 column vectors, which one may choose out of a 8-by-8 Hadamard matrix, and then generating 8 sets of WFCs; and (3) storing the 8 sets of WFCs in 8 separated memory sets, which can be either a user's storage device or a location in his/her registered cloud space. Specifically in the aforementioned (2), the generated 8 sets of WFCs is the product of the following matrix multiplication:

$$\begin{bmatrix} 10 \\ -2 \\ -4 \\ 0 \\ 10 \\ -2 \\ -4 \\ 0 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \\ 1 & 1 & 1 & 1 \\ 1 & -1 & 1 & -1 \\ 1 & 1 & -1 & -1 \\ 1 & -1 & -1 & 1 \end{bmatrix} \begin{bmatrix} 1 \\ 2 \\ 3 \\ 4 \end{bmatrix}.$$

To generate the 8 sets of WFCs, we can consider the 4 segments $S_1=1$, $S_2=2$, $S_3=3$ and $S_4=4$. But we can also include more auxiliary segments whose values are known a priori in order to generate new sets of WFCs.

Upon retrieving, the data set $\underline{S}$ with 4 data points can be restored if any 4 of the 8 stored data sets are available. This represents an example of M=4 substreams transformed to 8 WFCs with "degree of shared-redundancy" N+M=8. Each substream features a unique weighting distribution in the N+M (N+M=8) memory sets. There are M (M=4) weighting components among the M (M=4) data substreams in a memory set, and these M (M=4) weighting components are different from one memory set to another. There are M weighting distributions in the M+N dimension, which are mutually orthogonal to one another in the M+N dimensional space.

The present invention also relates to distributed data storage systems with built-in redundancy for multiple (M) independent data streams concurrently converted into WF muxed domain with M+N output WFCs, and stored these M+N WFC output data into M+N separated data storage sets, where N and M are integers and N>0. As a result: (1) each memory set stores a weighted sum of the M independent data streams, i.e. a linear combination of all the M independent data streams, and (2) each data stream features a unique weighting distribution in the M+N memory sets. There are M such weighting distributions, which are mutually orthogonal to one another in the M+N dimensional space. Each dimension is associated to an output of the WF muxer.

When the input data sets of a WF muxer feature, say, 100 MB each, and each of the WFCs will then feature about $(1+\varepsilon)\times 100$ MB. The overhead constant, $\varepsilon$, can be designed to be about 15% or less. A total 400 MB data will be stored in 8 physical separated sites in user's storage devices and/or his/her registered cloud space. Each site features a storage of the size of $(1+\varepsilon)\times 100$ MB. This storage architecture via WF muxing will have the following feature: (1) distributed and securely stored WFC via "summing" independent data, not encrypted nor encoded; (2) with built-in redundancy for survivability, only requiring 4 of the 8 stored WFCs to reconstruct the 4 original data sets; and (3) monitoring distributed data sets for data integrity via recovered diagnostic signals at ports of a WF demuxing processor without examining stored data sets themselves.

The present invention discloses operation concepts, methods and implementations of distributed systems via wavefront multiplexing in cloud storage as depicted in FIG. 1. Similar techniques can be applied to video streaming, secured mail services, secured file transfers, and other applications via Internet clouds. The embodiments of present inventions comprise of three important segments: the pre-storage processing on user end, multiple locations in user's storage devices and his/her registered cloud space, and the post-retrieval processing. We will use a single user for both pre-storage processing and a post-retrieval processing as an example for illustrating the operation concepts. In principle, the pre-storage processing and the post-retrieval processing may be in user segments and resided on equipment on user side, or on storage operator facilities. These operators will aggregate multiple data storage sets distributed over remote networks, the user's computers and his/her storage devices.

Embodiment 1

FIG. 1 depicts an operation concept of using WF muxing/demuxing techniques for storing 4 sets of data 100, $S_1$, $S_2$, $S_3$ and $S_4$, in 8 physically separated data storage sites 106, 108, 110, 112, 114, 116, 118 and 120. The 4 sets of data 100 can represent 4 files of identical size, or 4 segments of identical size that are outcome of all possible manipulations on a single file or multiple files. A pre-storage processor 102 performs WF muxing that transforms the 4 data sets $S_1$, $S_2$, $S_3$ and $S_4$ to 104, the 8 WFCs $D_1$, $D_2$, $D_3$, $D_4$, $D_5$, $D_6$, $D_7$ and $D_8$. The pre-storage processor 102 can also perform WF muxing by taking 4 additional zero data sets as if these 4 sets were grounded circuit input pins.

FIG. 1 also shows a retrieval process of the 4 sets of data. The 8 WFCs, 104, are transported to 8 storage sites 106, 108, 110, 112, 114, 116, 118 and 120 individually through 8 different links 122, 124, 126, 128, 130, 132, 134 and 136. When demanded by the user, the 8 stored WFCs can be retrieved through 8 different links 140, 142, 144, 146, 148, 150, 152 and 154, and be transformed to the original data $S_1$, $S_2$, $S_3$ and $S_4$ by the post-retrieval processor 138 that performs WF demuxing.

The 8 physically distributed storage sites 106, 108, 110, 112, 114, 116, 118 and 120 can represent 8 locations in user's registered cloud space, or 7 sites in user's registered cloud space and 1 user's storage device, or 6 sites in user's registered cloud space and 2 user's storage devices, etc. Overall these 8 sites can represent i locations in user's registered cloud space and 8−i user's storage devices, where i=0, . . . , 8.

The pre-storage processor 102 performs WF muxing, which features a mathematical description in matrix multiplication:

$$\begin{bmatrix} D_1 \\ D_2 \\ D_3 \\ D_4 \\ D_5 \\ D_6 \\ D_7 \\ D_8 \end{bmatrix} = W_{8\text{-}by\text{-}4} \begin{bmatrix} S_1 \\ S_2 \\ S_3 \\ S_4 \end{bmatrix}.$$

The matrix $W_{8\text{-}by\text{-}4}$ represents an 8-by-4 matrix. Taking 4 column vectors our of an 8-by-8 Hadamard matrix as example, one can tabulate $W_{8\text{-}by\text{-}4}$ as shown in the following table.

| | | | |
|---|---|---|---|
| 1 | 1 | 1 | 1 |
| 1 | −1 | 1 | −1 |
| 1 | 1 | −1 | −1 |
| 1 | −1 | −1 | 1 |
| 1 | 1 | 1 | 1 |
| 1 | −1 | 1 | −1 |

-continued

| | | | |
|---|---|---|---|
| 1 | 1 | −1 | −1 |
| 1 | −1 | −1 | 1 |

Equivalently, four auxiliary segments (constants) are introduced such that their values are known and the number of equations, M+N, remains the same. Let these auxiliary segments (constants) be $S_5=0$, $S_6=0$, $S_7=0$ and $S_8=0$. It is therefore more sufficient to append an 8-by-8 matrix by N=4 additional rows for describing all involved (M+N+N=12) constraints via the following matrix multiplication:

$$\begin{bmatrix} D_1 \\ D_2 \\ D_3 \\ D_4 \\ D_5 \\ D_6 \\ D_7 \\ D_8 \\ 0 \\ 0 \\ 0 \\ 0 \end{bmatrix} = W_{12\text{-}by\text{-}8} \begin{bmatrix} S_1 \\ S_2 \\ S_3 \\ S_4 \\ S_5 \\ S_6 \\ S_7 \\ S_8 \end{bmatrix}.$$

The matrix $W_{12\text{-}by\text{-}8}$ represents a 12-by-8 matrix, as tabulated below to be an example. It is constructed as an appended $W_{8\text{-}by\text{-}4}$ with 4 additional rows.

| | | | | | | | |
|---|---|---|---|---|---|---|---|
| 1 | 1 | 1 | 1 | 1 | 1 | 1 | 1 |
| 1 | −1 | 1 | −1 | 1 | −1 | 1 | −1 |
| 1 | 1 | −1 | −1 | 1 | 1 | −1 | −1 |
| 1 | −1 | −1 | 1 | 1 | −1 | −1 | 1 |
| 1 | 1 | 1 | 1 | −1 | −1 | −1 | −1 |
| 1 | −1 | 1 | −1 | −1 | 1 | −1 | 1 |
| 1 | 1 | −1 | −1 | −1 | −1 | 1 | 1 |
| 1 | −1 | −1 | 1 | −1 | 1 | 1 | −1 |
| 0 | 0 | 0 | 0 | 1 | 0 | 0 | 0 |
| 0 | 0 | 0 | 0 | 0 | 1 | 0 | 0 |
| 0 | 0 | 0 | 0 | 0 | 0 | 1 | 0 |
| 0 | 0 | 0 | 0 | 0 | 0 | 0 | 1 |

As shown in FIG. 1, the data sets 100 are to be stored in 8 storage sites 106, 108, 110, 112, 114, 116, 118 and 120 individually. The stored data sets are in forms of streams of numerical numbers as results of 8 different linear combinations of the same 4 data sets. Each of the 8 storage sites, 106, 108, 110, 112, 114, 116, 118 and 120, only stores one of the 8 assigned WFCs (104). Each of the WFCs is not comprehensible, and/or may appear with misleading information.

For any WFC $D_i$, i=1, . . . , 8, 2i+120 represents a cloud-uploading link (wired, wireless or other applicable means) instantiated by the user for "writing" $D_i$ into site 2i+104 in his/her registered cloud space, or a device-importing link (serial or other applicable means) selected by the user for writing $D_i$ into site 2i+104 in his/her storage devices (disks, hard drives or other applicable means). For any WFC $D_i$, i=1, . . . , 8, 2i+138 represents a cloud-downloading link (wired, wireless or other applicable means) instantiated by the user for "reading" $D_i$ from site 2i+104 in his/her registered cloud space, or a device-exporting link (serial or other applicable means) selected by the user for reading $D_i$ from site 2i+104 in his/her storage devices.

The post-retrieving processor 138 performs WF demuxing according to 4 row vectors of a 4-by-8 matrix, $W_{4\text{-}by\text{-}8}$.

$$\begin{bmatrix} S_1 \\ S_2 \\ S_3 \\ S_4 \end{bmatrix} = W_{4\text{-}by\text{-}8} \begin{bmatrix} D_1 \\ D_2 \\ D_3 \\ D_4 \\ D_5 \\ D_6 \\ D_7 \\ D_8 \end{bmatrix}.$$

The matrix $W_{4\text{-}by\text{-}8}$ represents a 4-by-8 matrix, as tabulated below to be an example.

| | | | | | | | |
|---|---|---|---|---|---|---|---|
| 1/8 | 1/8 | 1/8 | 1/8 | 1/8 | 1/8 | 1/8 | 1/8 |
| 1/8 | −1/8 | 1/8 | −1/8 | 1/8 | −1/8 | 1/8 | −1/8 |
| 1/8 | 1/8 | −1/8 | −1/8 | 1/8 | 1/8 | −1/8 | −1/8 |
| 1/8 | −1/8 | −1/8 | 1/8 | 1/8 | −1/8 | −1/8 | 1/8 |

Four auxiliary constraints need to be retained in accordance to the four auxiliary segments (constants) $S_5=0$, $S_6=0$, $S_7=0$ and $S_8=0$.

$$\begin{bmatrix} 0 \\ 0 \\ 0 \\ 0 \end{bmatrix} \equiv \begin{bmatrix} S_5 \\ S_6 \\ S_7 \\ S_8 \end{bmatrix} = W_{4\text{-}by\text{-}8,aux} \begin{bmatrix} D_1 \\ D_2 \\ D_3 \\ D_4 \\ D_5 \\ D_6 \\ D_7 \\ D_8 \end{bmatrix}.$$

The matrix $W_{4\text{-}by\text{-}8,aux}$ represents a 4-by-8 matrix, as tabulated below.

| | | | | | | | |
|---|---|---|---|---|---|---|---|
| 1/8 | 1/8 | 1/8 | 1/8 | −1/8 | −1/8 | −1/8 | −1/8 |
| 1/8 | −1/8 | 1/8 | −1/8 | −1/8 | 1/8 | −1/8 | 1/8 |
| 1/8 | 1/8 | −1/8 | −1/8 | −1/8 | −1/8 | 1/8 | 1/8 |
| 1/8 | −1/8 | −1/8 | 1/8 | −1/8 | 1/8 | 1/8 | −1/8 |

It can be seen that if any $D_j$ was modified unexpectedly, the above constraints would fail to hold, which would reveal that the integrity in the stored WFCs was compromised.

In fact, the WFCs also feature repetition such that $D_1=D_5$, $D_2=D_6$, $D_3=D_7$ and $D_4=D_8$. To remove this feature, the four auxiliary segments (constants), $S_5=0$, $S_6=0$, $S_7=0$ and $S_8=0$, can be modified such that they can also take non-zero values or bear dependency on $S_i$, i=1, 2, 3, 4. With this premise, the architecture in FIG. 1 features "degree of shared-redundancy" N+M=8. Given that each of the 8 sites, 106, 108, 110, 112, 114, 116, 118 and 120, has equal survivability of 90% over next month, the overall survivability, one can deduce that the probability of at least 4 sites being available, is $$\Sigma_{k=4}^{8} \binom{8}{k} 0.9^k (1-0.9)^{8-k} = 0.9996.$$

Without the shared-redundancy, the required survivability, the probability of exactly 4 sites being available, would be $0.9^4=0.6561$.

One can compare the WF muxing/demuxing technologies with RAID based on the architecture in FIG. 1. For a RAID technology that performs mirroring such that $S_1$ is stored in 106 and 108, $S_2$ in 110 and 112, $S_3$ in 114 and 116, and $S_4$ in 118 and 120. RAID fails to provide data survivability if the sites 106, 108, 110 and 112 are not available. RAID also fails if the sites 114, 116, 118 and 120 are not available. For a RAID technology that forms 4 parity sets and transport the 4 data sets to 4 sites 106, 108, 110, and 112, and the 4 parity sets to 4 sites 114, 116, 118 and 120, it fails to protect the stored data set if unauthorized party eavesdrops on any site of 106, 108, 110, or 112. On the contrary, each of the WFCs is not comprehensible, and/or may appear with misleading information.

Embodiment 2

Figure 2:
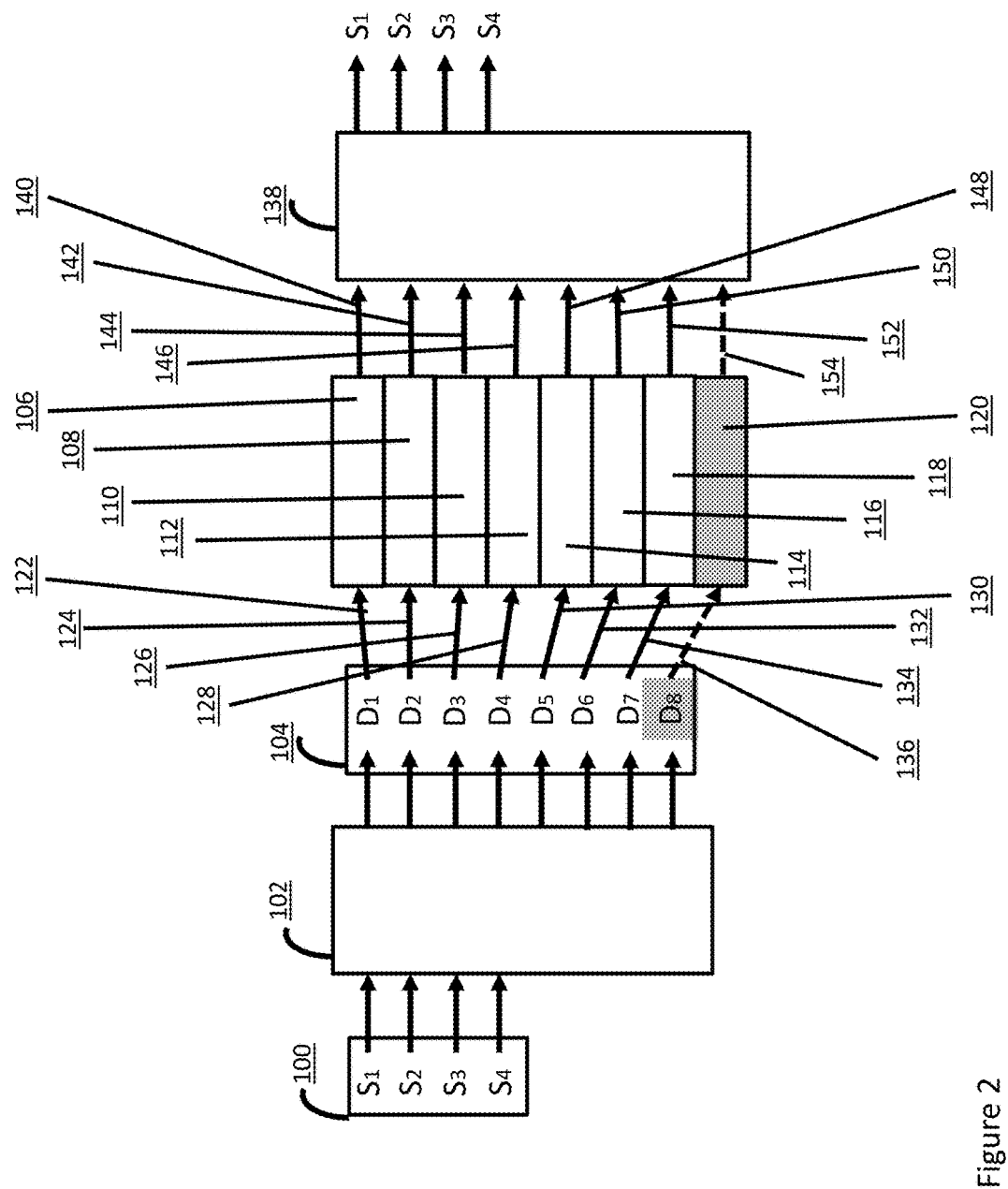
FIG. 2 depicts a block diagram on distributed data storage for 4 independent data sets of nearly identical data size via WF muxing techniques and associated retrieval processing via WF demuxing when one of the stored data sets is not available.

Similar to FIG. 1, FIG. 2 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. $D_8$ is however not available and cannot be retrieved by the post-retrieval processor 138. The unavailability of $D_8$ may be due to various circumstances along the path of 136-120-154: (1) link 136 is established or damaged, site 120 is functioning or damaged, but link 154 is damaged; (2) link 136 is established, link 154 is established or damaged, but site 120 is damaged; and (3) site 120 is functioning or damaged, link 154 is established or damaged, but link 136 is damaged.

The remaining 7 WFCs, $D_1$, $D_2$, $D_3$, $D_4$, $D_5$, $D_6$, and $D_7$, can be transported individually via 7 links, 140, 142, 144, 146, 148, 150, and 152, to the post-retrieval processor 138, which reconstitutes the 4 sets of data $S_1$, $S_2$, $S_3$ and $S_4$ by treating $D_8$ as an auxiliary unknown variable to be solved:

$$\begin{bmatrix} D_1 \\ D_2 \\ D_3 \\ D_4 \\ D_5 \\ D_6 \\ D_7 \\ 0 \\ 0 \\ 0 \\ 0 \\ 0 \end{bmatrix} = W_{12\text{-}by\text{-}9} \begin{bmatrix} S_1 \\ S_2 \\ S_3 \\ S_4 \\ S_5 \\ S_6 \\ S_7 \\ S_8 \\ D_8 \end{bmatrix}.$$

The matrix $W_{12\text{-}by\text{-}9}$ represents a 12-by-9 matrix, as tabulated below to be an example.

| | | | | | | | | |
|---|---|---|---|---|---|---|---|---|
| 1 | 1 | 1 | 1 | 1 | 1 | 1 | 1 | 0 |
| 1 | -1 | 1 | -1 | 1 | -1 | 1 | -1 | 0 |
| 1 | 1 | -1 | -1 | 1 | 1 | -1 | -1 | 0 |
| 1 | -1 | -1 | 1 | 1 | -1 | -1 | 1 | 0 |
| 1 | 1 | 1 | 1 | -1 | -1 | -1 | -1 | 0 |
| 1 | -1 | 1 | -1 | -1 | 1 | -1 | 1 | 0 |
| 1 | 1 | -1 | -1 | -1 | -1 | 1 | 1 | 0 |
| 1 | -1 | -1 | 1 | -1 | 1 | 1 | -1 | -1 |
| 0 | 0 | 0 | 0 | 1 | 0 | 0 | 0 | 0 |
| 0 | 0 | 0 | 0 | 0 | 1 | 0 | 0 | 0 |
| 0 | 0 | 0 | 0 | 0 | 0 | 1 | 0 | 0 |
| 0 | 0 | 0 | 0 | 0 | 0 | 0 | 1 | 0 |

FIG. 2 represents one of the $\binom{8}{1}=8$ cases in which one WFC $D_i$, i=1, . . . , 8, is not available. When exactly one WFC is missing, the post-retrieval processor 138 can reconstitute the 4 sets of data $S_1$, $S_2$, $S_3$ and $S_4$ by the remaining 7 WFCs, each of which is attached to established links $2j$+120 and $2j$+138, j≠i. The post-retrieval processor 138 reconstitutes the 4 sets of data $S_1$, $S_2$, $S_3$ and $S_4$ by treating $D_i$ as an auxiliary unknown variable to be solved, given that $W_{12\text{-}by\text{-}9}$ is constructed properly.

Embodiment 3

Figure 3:
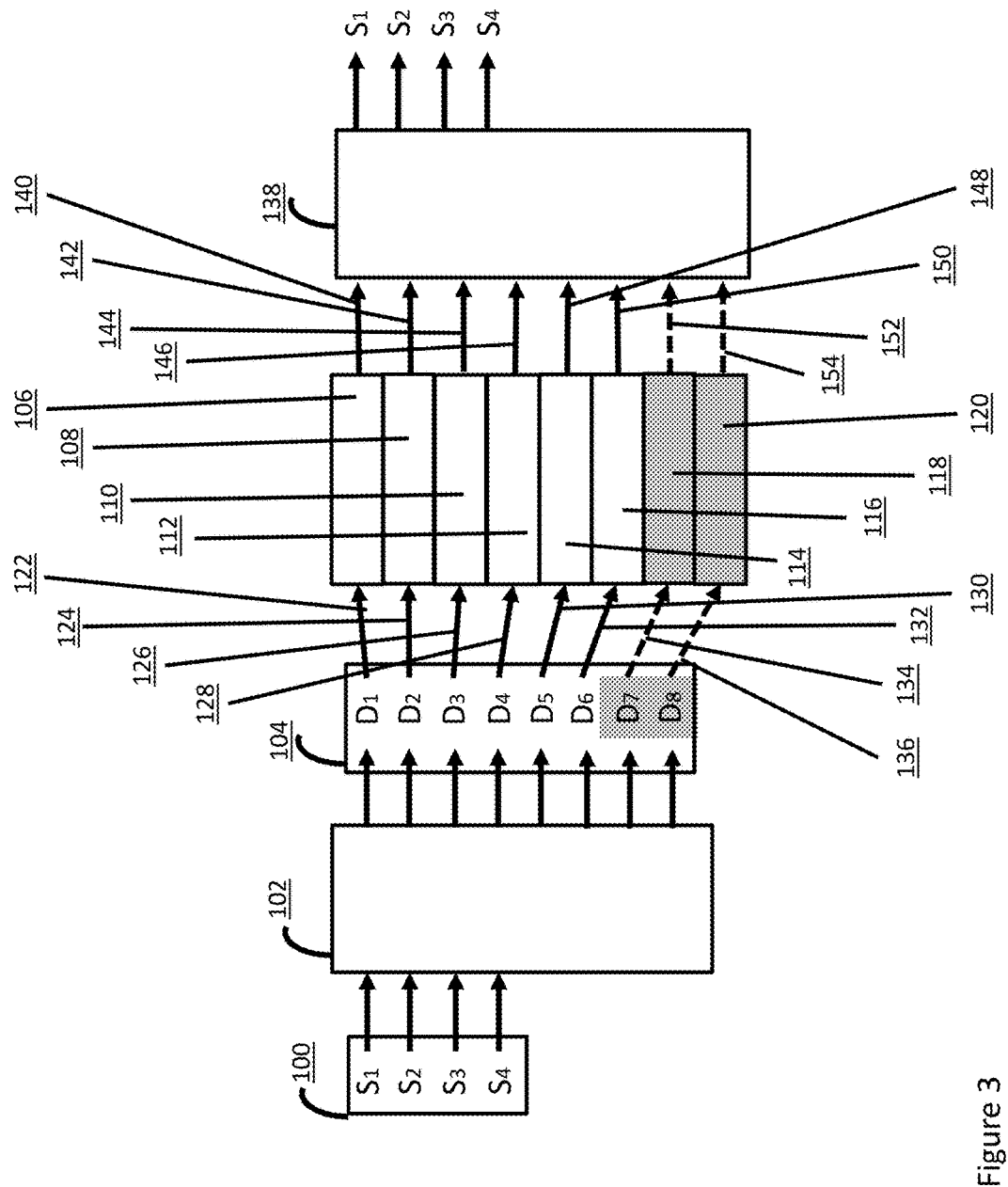
FIG. 3 depicts a block diagram on distributed data storage for 4 independent data sets of nearly identical data size via WF muxing techniques and associated retrieval processing via WF demuxing when two of the stored data sets are not available.

Similar to FIG. 1, FIG. 3 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. $D_7$ and $D_8$ are however not available and cannot be retrieved by the post-retrieval processor 138.

The unavailability of $D_7$ may be due to various circumstances along the path of 134-118-152: (1) link 134 is established or damaged, site 118 is functioning or damaged, but link 152 is damaged; (2) link 134 is established, link 152 is established or damaged, but site 118 is damaged; and (3) site 118 is functioning or damaged, link 152 is established or damaged, but link 134 is damaged.

The unavailability of $D_8$ may be due to various circumstances as stated in Embodiment 2.

The remaining 6 WFCs, $D_1$, $D_2$, $D_3$, $D_4$, $D_5$, and $D_6$, can be transported individually via 6 links, 140, 142, 144, 146, 148, and 150, to the post-retrieval processor 138, which reconstitutes the 4 sets of data $S_1$, $S_2$, $S_3$ and $S_4$ by treating $D_7$ and $D_8$ as auxiliary unknown variables to be solved:

$$\begin{bmatrix} D_1 \\ D_2 \\ D_3 \\ D_4 \\ D_5 \\ D_6 \\ 0 \\ 0 \\ 0 \\ 0 \\ 0 \\ 0 \end{bmatrix} = W_{12\text{-}by\text{-}10} \begin{bmatrix} S_1 \\ S_2 \\ S_3 \\ S_4 \\ S_5 \\ S_6 \\ S_7 \\ S_8 \\ D_7 \\ D_8 \end{bmatrix}.$$

The matrix $W_{12\text{-}by\text{-}10}$ represents a 12-by-10 matrix, as tabulated below to be an example.

| | | | | | | | | | |
|---|---|---|---|---|---|---|---|---|---|
| 1 | 1 | 1 | 1 | 1 | 1 | 1 | 1 | 0 | 0 |
| 1 | -1 | 1 | -1 | 1 | -1 | 1 | -1 | 0 | 0 |
| 1 | 1 | -1 | -1 | 1 | 1 | -1 | -1 | 0 | 0 |
| 1 | -1 | -1 | 1 | 1 | -1 | -1 | 1 | 0 | 0 |
| 1 | 1 | 1 | 1 | -1 | -1 | -1 | -1 | 0 | 0 |
| 1 | -1 | 1 | -1 | -1 | 1 | -1 | 1 | 0 | 0 |
| 1 | 1 | -1 | -1 | -1 | -1 | 1 | 1 | -1 | 0 |
| 1 | -1 | -1 | 1 | -1 | 1 | 1 | -1 | 0 | -1 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |

FIG. 3 represents one of the $\binom{8}{2}=28$ cases in which two WFCs $D_i$ and $D_j$, i,j∈{i≠j,i,j=1, . . . , 8}, are not available. When exactly two WFCs are missing, the post-retrieval processor 138 can reconstitute the 4 sets of data $S_1$, $S_2$, $S_3$ and $S_4$ by the remaining 6 WFCs, each of which is attached to established links $2k+120$ and $2k+138$, $k \neq i$, $k \neq j$. The post-retrieval processor 138 reconstitutes the 4 sets of data $S_1$, $S_2$, $S_3$ and $S_4$ by treating $D_i$ and $D_j$ as auxiliary unknown variables to be solved, given that $W_{12\text{-}by\text{-}10}$ is constructed properly.

Embodiment 4

Figure 4:
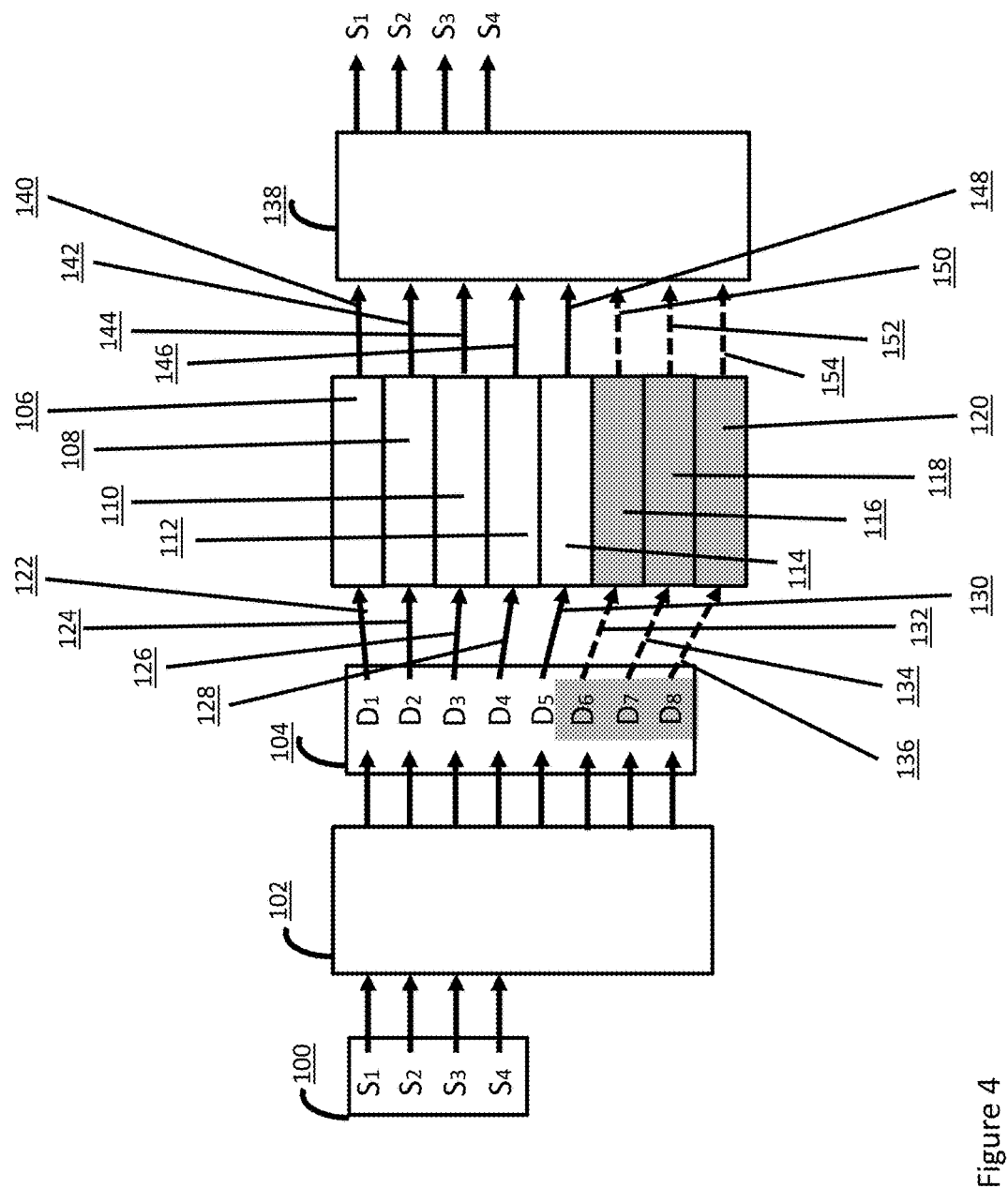
FIG. 4 depicts a block diagram on distributed data storage for 4 independent data sets of nearly identical data size via WF muxing techniques and associated retrieval processing via WF demuxing when three of the stored data sets are not available.

Similar to FIG. 1, FIG. 4 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. $D_6$, $D_7$ and $D_8$ are however not available and cannot be retrieved by the post-retrieval processor 138.

The unavailability of $D_6$ may be due to various circumstances along the path of 132-116-150: (1) link 132 is established or damaged, site 116 is functioning or damaged, but link 150 is damaged; (2) link 132 is established, link 150 is established or damaged, but site 116 is damaged; and (3) site 116 is functioning or damaged, link 150 is established or damaged, but link 132 is damaged.

The unavailability of $D_7$ and $D_8$ may be due to various circumstances as stated in Embodiment 2 and Embodiment 3.

The remaining 5 WFCs, $D_1$, $D_2$, $D_3$, $D_4$, and $D_5$, can be transported individually via 5 links, 140, 142, 144, 146, and 148, to the post-retrieval processor 138, which reconstitutes the 4 sets of data $S_1$, $S_2$, $S_3$ and $S_4$ by treating $D_6$, $D_7$ and $D_8$ as auxiliary unknown variables to be solved:

$$\begin{bmatrix} D_1 \\ D_2 \\ D_3 \\ D_4 \\ D_5 \\ 0 \\ 0 \\ 0 \\ 0 \\ 0 \\ 0 \\ 0 \end{bmatrix} = W_{12\text{-}by\text{-}11} \begin{bmatrix} S_1 \\ S_2 \\ S_3 \\ S_4 \\ S_5 \\ S_6 \\ S_7 \\ S_8 \\ D_6 \\ D_7 \\ D_8 \end{bmatrix}.$$

The matrix $W_{12\text{-}by\text{-}11}$ represents a 12-by-11 matrix, as tabulated below to be an example.

| 1 | 1 | 1 | 1 | 1 | 1 | 1 | 1 | 0 | 0 | 0 |
|---|---|---|---|---|---|---|---|---|---|---|
| 1 | -1 | 1 | -1 | 1 | -1 | 1 | -1 | 0 | 0 | 0 |
| 1 | 1 | -1 | -1 | 1 | 1 | -1 | -1 | 0 | 0 | 0 |
| 1 | -1 | -1 | 1 | 1 | -1 | -1 | 1 | 0 | 0 | 0 |
| 1 | 1 | 1 | 1 | -1 | -1 | -1 | -1 | 0 | 0 | 0 |
| 1 | -1 | 1 | -1 | -1 | 1 | -1 | 1 | -1 | 0 | 0 |
| 1 | 1 | -1 | -1 | -1 | -1 | 1 | 1 | 0 | -1 | 0 |
| 1 | -1 | -1 | 1 | -1 | 1 | 1 | -1 | 0 | 0 | -1 |
| 0 | 0 | 0 | 0 | 1 | 0 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 0 | 1 | 0 | 0 | 0 | 0 |
| 0 | 0 | 0 | 0 | 0 | 0 | 0 | 1 | 0 | 0 | 0 |

FIG. 4 represents one of the $\binom{8}{3}=56$ cases in which three WFCs $D_i$, $D_j$ and $D_p$, $i,j,p \in \{i \neq j, i \neq p, p \neq j, i,j,p=1, \ldots, 8\}$, are not available. When exactly three WFCs are missing, the post-retrieval processor 138 can reconstitute the 4 sets of data $S_1$, $S_2$, $S_3$ and $S_4$ by the remaining 5 WFCs, each of which is attached to established links $2k+120$ and $2k+138$, $k \neq i$, $k \neq j$, $k \neq p$. The post-retrieval processor 138 reconstitutes the 4 sets of data $S_1$, $S_2$, $S_3$ and $S_4$ by treating $D_i$, $D_j$ and $D_p$ as auxiliary unknown variables to be solved, given that $W_{12\text{-}by\text{-}11}$ is constructed properly.

Embodiment 5

Figure 5:
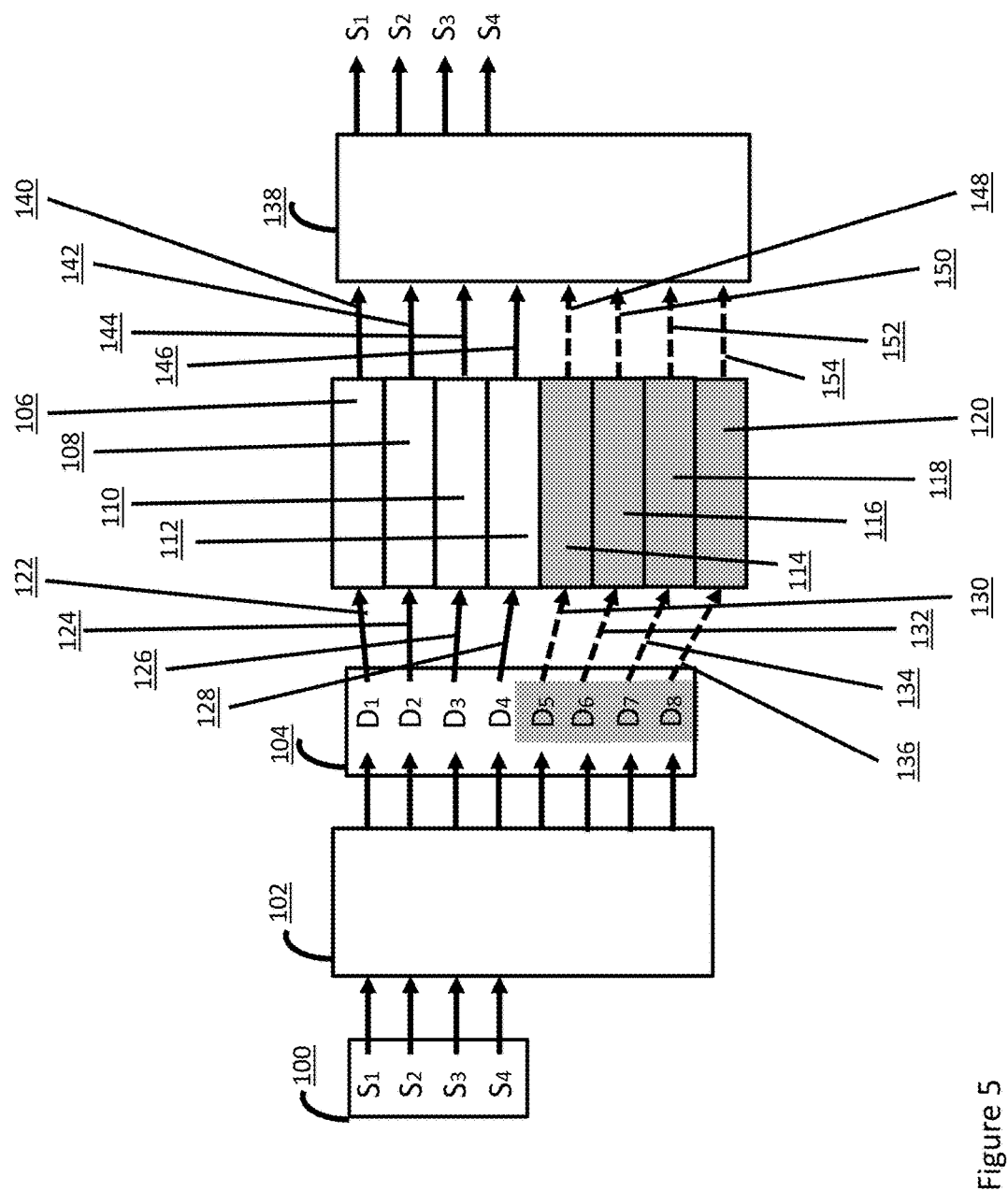
FIG. 5 depicts a block diagram on distributed data storage for 4 independent data sets of nearly identical data size via WF muxing techniques and associated retrieval processing via WF demuxing when four of the stored data sets is not available.

Similar to FIG. 1, FIG. 5 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. $D_5$, $D_6$, $D_7$ and $D_8$ are however not available and cannot be retrieved by the post-retrieval processor 138.

The unavailability of $D_5$ may be due to various circumstances along the path of 130-114-148: (1) link 130 is established or damaged, site 114 is functioning or damaged, but link 148 is damaged; (2) link 130 is established, link 148 is established or damaged, but site 114 is damaged; and (3) site 114 is functioning or damaged, link 148 is established or damaged, but link 130 is damaged.

The unavailability of $D_6$, $D_7$ and $D_8$ may be due to various circumstances as stated in Embodiment 2, Embodiment 3 and Embodiment 4.

The remaining 4 WFCs, $D_1$, $D_2$, $D_3$, and $D_4$, can be transported individually via 4 links, 140, 142, 144, and 146, to the post-retrieval processor 138, which reconstitutes the 4 sets of data $S_1$, $S_2$, $S_3$ and $S_4$ by treating $D_5$, $D_6$, $D_7$ and $D_8$ as auxiliary unknown variables to be solved:

$$\begin{bmatrix} D_1 \\ D_2 \\ D_3 \\ D_4 \\ 0 \\ 0 \\ 0 \\ 0 \\ 0 \\ 0 \\ 0 \\ 0 \end{bmatrix} = W_{12\text{-}by\text{-}12} \begin{bmatrix} S_1 \\ S_2 \\ S_3 \\ S_4 \\ S_5 \\ S_6 \\ S_7 \\ S_8 \\ D_5 \\ D_6 \\ D_7 \\ D_8 \end{bmatrix}.$$

The matrix $W_{12\text{-}by\text{-}12}$ represents a 12-by-12 matrix, as tabulated below to be an example.

| 1 | 1 | 1 | 1 | 1 | 1 | 1 | 1 | 0 | 0 | 0 | 0 |
|---|---|---|---|---|---|---|---|---|---|---|---|
| 1 | -1 | 1 | -1 | 1 | -1 | 1 | -1 | 0 | 0 | 0 | 0 |
| 1 | 1 | -1 | -1 | 1 | 1 | -1 | -1 | 0 | 0 | 0 | 0 |
| 1 | -1 | -1 | 1 | 1 | -1 | -1 | 1 | 0 | 0 | 0 | 0 |
| 1 | 1 | 1 | 1 | -1 | -1 | -1 | -1 | -1 | 0 | 0 | 0 |
| 1 | -1 | 1 | -1 | -1 | 1 | -1 | 1 | 0 | -1 | 0 | 0 |
| 1 | 1 | -1 | -1 | -1 | -1 | 1 | 1 | 0 | 0 | -1 | 0 |
| 1 | -1 | -1 | 1 | -1 | 1 | 1 | -1 | 0 | 0 | 0 | -1 |
| 0 | 0 | 0 | 0 | 1 | 0 | 0 | 0 | 0 | 0 | 0 | 0 |
| 0 | 0 | 0 | 0 | 0 | 1 | 0 | 0 | 0 | 0 | 0 | 0 |
| 0 | 0 | 0 | 0 | 0 | 0 | 1 | 0 | 0 | 0 | 0 | 0 |
| 0 | 0 | 0 | 0 | 0 | 0 | 0 | 1 | 0 | 0 | 0 | 0 |

FIG. 5 represents one of the $\binom{8}{4}=70$ cases in which four WFCs $D_i$, $D_j$, $D_p$ and $D_q$, $i,j,p,q \in \{i \neq j, i \neq p, i \neq q, j \neq p, j \neq q, p \neq q, i,j,p,q=1, \ldots, 8\}$, are not available. When exactly four WFCs are missing, the post-retrieval processor 138 can reconstitute the 4 sets of data $S_1$, $S_2$, $S_3$ and $S_4$ by the remaining 4 WFCs, each of which is attached to established links $2k+120$ and $2k+138$, $k\neq i$, $k\neq j$, $k\neq p$, $k\neq q$. The post-retrieval processor 138 reconstitutes the 4 sets of data $S_1$, $S_2$, $S_3$ and $S_4$ by treating $D_i$, $D_j$, $D_p$ and $D_q$ as auxiliary unknown variables to be solved, given that $W_{12\text{-}by\text{-}12}$ is constructed properly.

Embodiment 6

Figure 6:
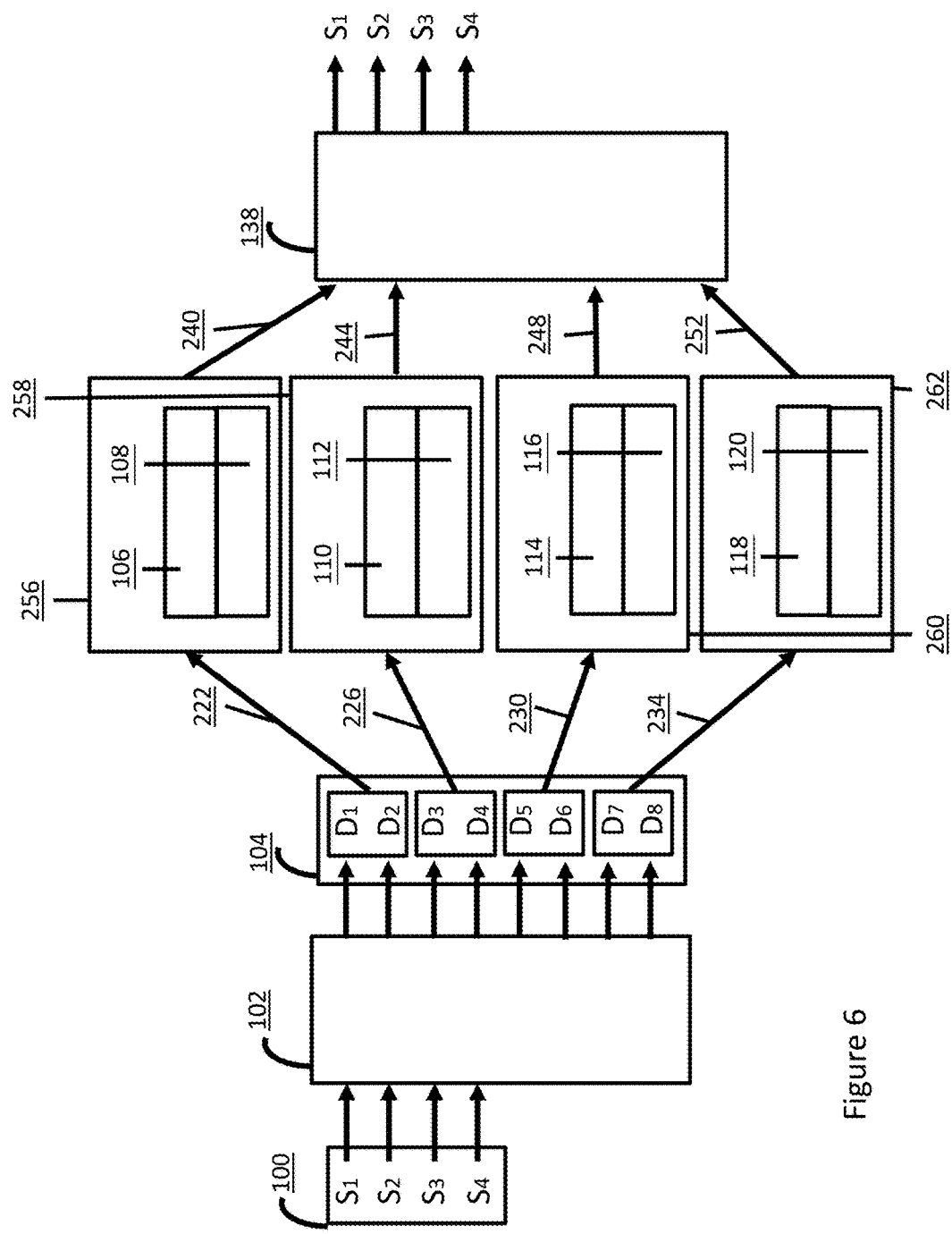
FIG. 6 depicts a block diagram on distributed data storage for 4 independent data sets of nearly identical data size via WF muxing techniques and associated retrieval processing via WF demuxing from multiple stored data sets grouped separately in 4 aggregated sites via WF demuxing.

FIG. 6 depicts an operation concept of using WF muxing/demuxing techniques for storing 4 sets of data 100, $S_1$, $S_2$, $S_3$ and $S_4$, in 8 physically separated data storage sites 106, 108, 110, 112, 114, 116, 118 and 120. The 4 sets of data 100 can represent 4 files of identical size, or 4 segments of identical size that are outcome of all possible manipulations on a single file or multiple files. As stated in Embodiment 1, a pre-storage processor 102 performs WF muxing that transforms the 4 data sets $S_1$, $S_2$, $S_3$ and $S_4$ to 104, the 8 WFCs $D_1$, $D_2$, $D_3$, $D_4$, $D_5$, $D_6$, $D_7$ and $D_8$. The pre-storage processor 102 can also perform WF muxing by taking 4 additional zero data sets as if these 4 sets were grounded circuit input pins. These 4 additional data sets may also take non-zero values or bear dependency on $S_i$, $i=1, 2, 3, 4$.

FIG. 6 also shows a retrieval process of the 4 sets of data. The 8 WFCs, 104, are transported to 8 storage sites 106, 108, 110, 112, 114, 116, 118 and 120 individually through 4 different links 222, 226, 230, and 234. When demanded by the user, the 8 stored WFCs can be retrieved through 4 different links 240, 244, 248, and 252, and be transformed to the original data $S_1$, $S_2$, $S_3$ and $S_4$ by the post-retrieval processor 138 that performs WF demuxing as stated in Embodiment 1.

Different from Embodiment 1, the WFCs $D_1$ and $D_2$ share the link 222 to enter the aggregated site 256, the WFCs $D_3$ and $D_4$ share the link 226 to enter the aggregated site 258, the WFCs $D_5$ and $D_6$ share the link 230 to enter the aggregated site 260, and the WFCs $D_7$ and $D_8$ share the link 234 to enter the aggregated site 262.

Different from Embodiment 1, the WFCs $D_1$ and $D_2$ share the link 240 to be transported from the aggregated site 256, the WFCs $D_3$ and $D_4$ share the link 244 to be transported from the aggregated site 258, the WFCs $D_5$ and $D_6$ share the link 248 to be transported from the aggregated site 260, and the WFCs $D_7$ and $D_8$ share the link 252 to be transported from the aggregated site 262.

The 4 physically distributed aggregated storage sites 256, 258, 260, and 262 can represent 4 cloud storage accounts registered by the user, or 3 cloud storage accounts registered by the user and 1 user's storage device, or 2 cloud storage accounts registered by the user and 2 user's storage devices, etc. Overall these 4 aggregated sites can represent i cloud storage accounts registered by the user and 4−i user's storage devices, where $i=0, \ldots, 4$. Within each cloud storage account as an aggregated storage site, the boundary between different sites is defined by the notion of virtualization. Within each user's storage device as an aggregated storage site, the boundary between different sites is defined by user's partition or other applicable means.

Similar to Embodiment 1, the data sets 100 are to be stored in 8 storage sites 106, 108, 110, 112, 114, 116, 118 and 120 individually. The stored data sets are in forms of streams of numerical numbers as results of 8 different linear combinations of the same 4 data sets. Each of the 8 storage sites, 106, 108, 110, 112, 114, 116, 118 and 120, only stores one of the 8 assigned WFCs (104). Each of the WFCs is not comprehensible, and/or may appear with misleading information.

For any aggregated site $2i+254$, $i=1, \ldots, 4$, $4i+218$ represents a cloud-uploading link (wired, wireless or other applicable means) instantiated by the user for "writing" $D_{2i-1}$ and $D_{2i}$ into sites $4i+102$ and $4i+104$ in his/her registered cloud space, or a device-importing link (serial or other applicable means) selected by the user for writing $D_{2i-1}$ and $D_{2i}$ into sites $4i+102$ and $4i+104$ in his/her storage devices (disks, hard drives or other applicable means). For any aggregated site $2i+254$, $i=1, \ldots, 4$, $4i+236$ represents a cloud-downloading link (wired, wireless or other applicable means) instantiated by the user for "reading" $D_{2i-1}$ and $D_{2i}$ from sites $4i+102$ and $4i+104$, respectively, in his/her registered cloud space, or a device-exporting link (serial or other applicable means) selected by the user for reading $D_{2i-1}$ and $D_{2i}$ from sites $4i+102$ and $4i+104$, respectively, in his/her storage devices.

Considering the likely failure on the level of aggregated sites in FIG. 6, one can evaluate the data survivability based on "effective degree of shared-redundancy", which is 4 in this case. Given that each of the 4 aggregated sites, 256, 258, 260 and 262, has equal survivability of 90% over next month, and that two WFCs are unavailable upon the failure of their residing aggregated site, one can deduce the overall survivability, the probability of at least 2 aggregated sites being available, is $$\Sigma_{k=2}^{4} \binom{4}{k} 0.9^k (1-0.9)^{4-k} = 0.9996.$$

Without the shared-redundancy, one would assume each aggregated site now only stores one of the data 100, $S_1$, $S_2$, $S_3$ and $S_4$, and then deduce that the required survivability, the probability of exactly 4 aggregated sites being available, would be $0.9^4 = 0.6561$.

One can compare the WF muxing/demuxing technologies with RAID based on the architecture in FIG. 1. For a RAID technology that performs mirroring such that $S_1$ is stored in 256, $S_2$ in 258, $S_3$ in 260, and $S_4$ in 262. RAID fails to provide data survivability if the aggregated sites 256 and 258 are not available. RAID also fails if the aggregated sites 260 and 262 are not available. For a RAID technology that forms 4 parity sets and transport the 4 data sets to 4 sites 106, 108, 110, and 112, and the 4 parity sets to 4 sites 114, 116, 118 and 120, it fails to protect the stored data set if unauthorized party eavesdrops on any site of 106, 108, 110, or 112. On the contrary, each of the WFCs is not comprehensible, and/or may appear with misleading information.

Embodiment 7

Figure 7:
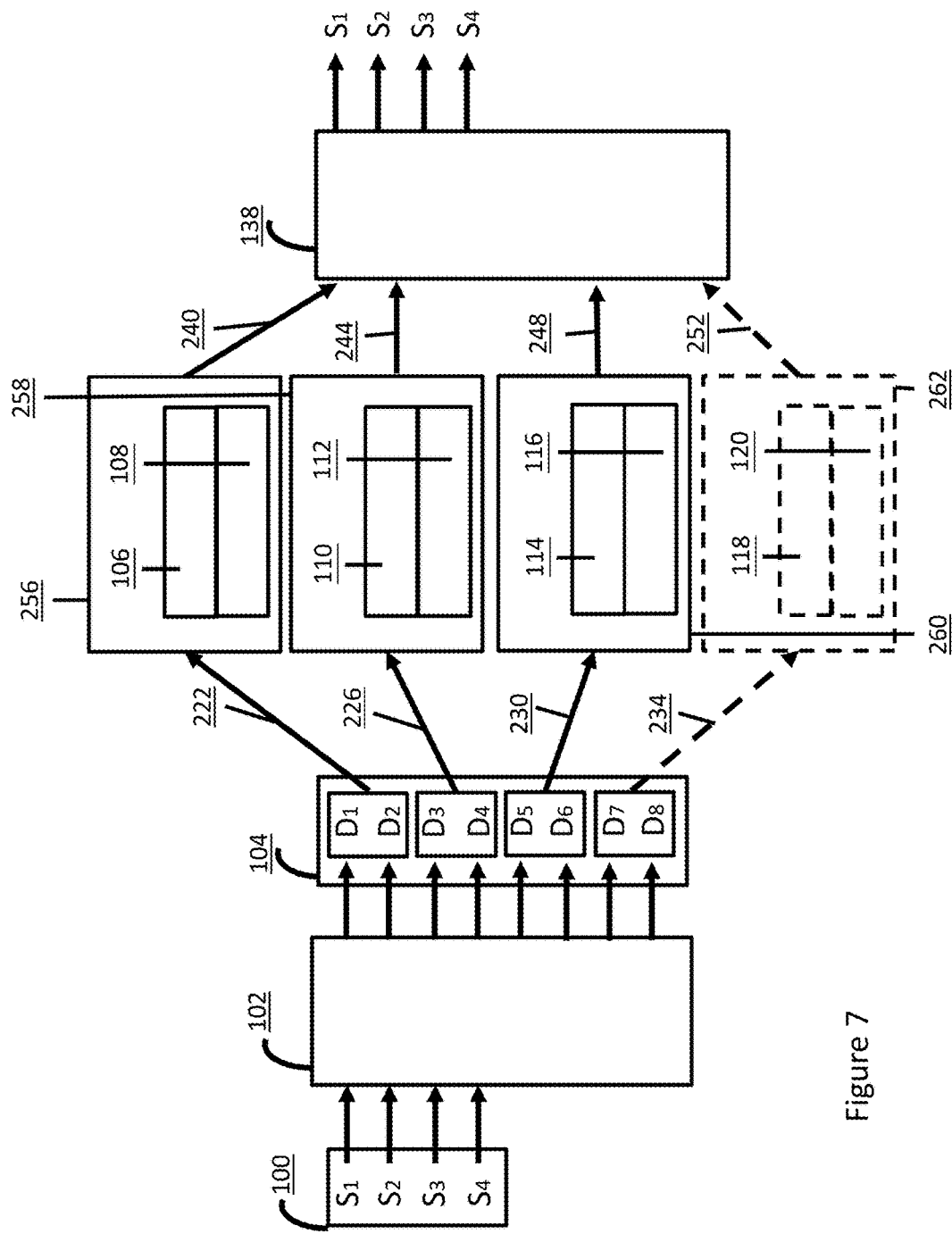
FIG. 7 depicts a block diagram on distributed data storage for 4 independent data sets of nearly identical data size via WF muxing techniques and associated retrieval processing via WF demuxing when one of the aggregated sites is not available.

Similar to FIG. 6, FIG. 7 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. As stated in Embodiment 1, a pre-storage processor 102 performs WF muxing that transforms the 4 data sets $S_1$, $S_2$, $S_3$ and $S_4$ to 104, the 8 WFCs $D_1$, $D_2$, $D_3$, $D_4$, $D_5$, $D_6$, $D_7$ and $D_8$. Two WFCs, $D_7$ and $D_8$, are however not available and cannot be retrieved by the post-retrieval processor 138.

The unavailability of $D_7$ and $D_8$ may be due to various circumstances along the path of 234-262-252: (1) link 234 is established or damaged, site 262 is functioning or damaged, but link 252 is damaged; (2) link 234 is established, link 252 is established or damaged, but site 262 is damaged; and (3) site 262 is functioning or damaged, link 252 is established or damaged, but link 234 is damaged.

The remaining 6 WFCs, $D_1$, $D_2$, $D_3$, $D_4$, $D_5$, and $D_6$, can be transported individually via 3 links, 240, 244, and 248, to the post-retrieval processor 138, which reconstitutes the 4 sets of data $S_1$, $S_2$, $S_3$ and $S_4$ by treating $D_7$ and $D_8$ as auxiliary unknown variables to be solved:

$$\begin{bmatrix} D_1 \\ D_2 \\ D_3 \\ D_4 \\ D_5 \\ D_6 \\ 0 \\ 0 \\ 0 \\ 0 \\ 0 \\ 0 \end{bmatrix} = W_{12\text{-}by\text{-}11} \begin{bmatrix} S_1 \\ S_2 \\ S_3 \\ S_4 \\ S_5 \\ S_6 \\ S_7 \\ S_8 \\ D_7 \\ D_8 \end{bmatrix}.$$

The matrix $W_{12\text{-}by\text{-}10}$ represents a 12-by-10 matrix, as tabulated below to be an example.

| | | | | | | | | | |
|---|---|---|---|---|---|---|---|---|---|
| 1 | 1 | 1 | 1 | 1 | 1 | 1 | 1 | 0 | 0 |
| 1 | -1 | 1 | -1 | 1 | -1 | 1 | -1 | 0 | 0 |
| 1 | 1 | -1 | -1 | 1 | 1 | -1 | -1 | 0 | 0 |
| 1 | -1 | -1 | 1 | 1 | -1 | -1 | 1 | 0 | 0 |
| 1 | 1 | 1 | 1 | -1 | -1 | -1 | -1 | 0 | 0 |
| 1 | -1 | 1 | -1 | -1 | 1 | -1 | 1 | 0 | 0 |
| 1 | 1 | -1 | -1 | -1 | -1 | 1 | 1 | -1 | 0 |
| 1 | -1 | -1 | 1 | -1 | 1 | 1 | -1 | 0 | -1 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |

FIG. 7 represents one of the $(^4_1)=4$ cases in which one of the aggregated sites, $2i+254$, $i=1,\ldots,4$, is not available. When exactly one aggregated site is missing, the post-retrieval processor 138 can reconstitute the 4 sets of data $S_1$, $S_2$, $S_3$ and $S_4$ by the remaining 3 aggregated sites, each of which is attached to established links $4k+218$ and $4k+236$, $k \neq i$. The post-retrieval processor 138 reconstitutes the 4 sets of data $S_1$, $S_2$, $S_3$ and $S_4$ by treating the two missing WFCs in the unavailable aggregated site $2i+254$ as auxiliary unknown variables to be solved, given that $W_{12\text{-}by\text{-}10}$ is constructed properly.

Embodiment 8

Figure 8:
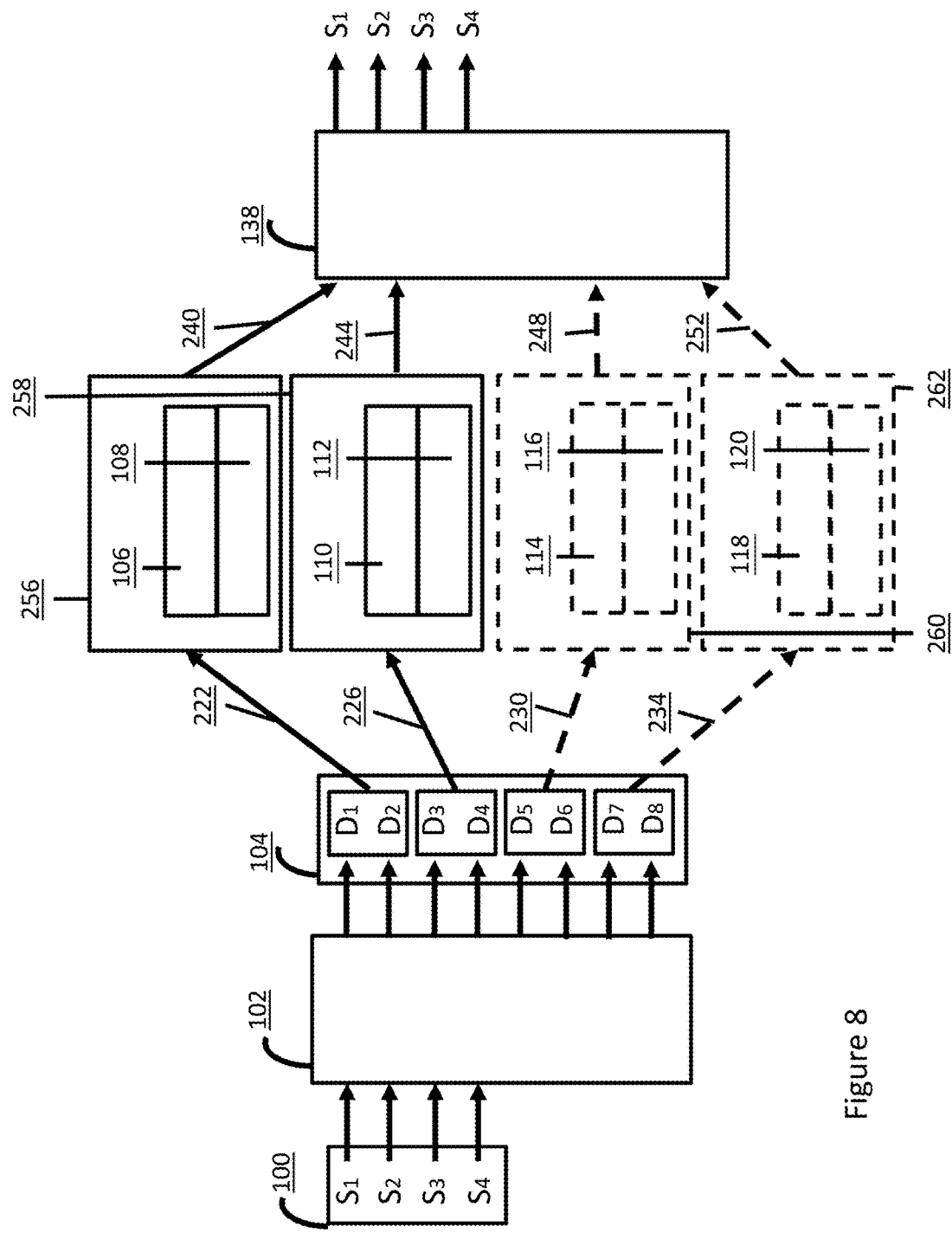
FIG. 8 depicts a block diagram on distributed data storage for 4 independent data sets of nearly identical data size via WF muxing techniques and associated retrieval processing via WF demuxing when two of the aggregated sites are not available.

Similar to FIG. 6, FIG. 8 depicts an operation concept of using WF muxing/demuxing techniques for storing 4 sets of data 100, $S_1$, $S_2$, $S_3$ and $S_4$, in 8 intended data storage sites 106, 108, 110, 112, 114, 116, 118 and 120. As stated in Embodiment 1, a pre-storage processor 102 performs WF muxing that transforms the 4 data sets $S_1$, $S_2$, $S_3$ and $S_4$ to 104, the 8 WFCs $D_1$, $D_2$, $D_3$, $D_4$, $D_5$, $D_6$, $D_7$ and $D_8$. Two aggregated sites, 260 and 262, and the stored WFCs $D_5$, $D_6$, $D_7$ and $D_8$, are however not available and cannot be retrieved by the post-retrieval processor 138.

The unavailability of $D_5$ and $D_6$ may be due to various circumstances along the path of 230-260-248: (1) link 230 is established or damaged, site 260 is functioning or damaged, but link 248 is damaged; (2) link 230 is established, link 248 is established or damaged, but site 260 is damaged; and (3) site 260 is functioning or damaged, link 248 is established or damaged, but link 230 is damaged.

The unavailability of $D_7$ and $D_8$ may be due to various circumstances as stated in Embodiment 7.

The remaining 4 WFCs, $D_1$, $D_2$, $D_3$, and $D_4$, can be transported individually via 2 links, 240, and 244, to the post-retrieval processor 138, which reconstitutes the 4 sets of data $S_1$, $S_2$, $S_3$ and $S_4$ by treating $D_5$, $D_6$, $D_7$ and $D_8$ as auxiliary unknown variables to be solved:

$$\begin{bmatrix} D_1 \\ D_2 \\ D_3 \\ D_4 \\ 0 \\ 0 \\ 0 \\ 0 \\ 0 \\ 0 \\ 0 \\ 0 \end{bmatrix} = W_{12\text{-}by\text{-}12} \begin{bmatrix} S_1 \\ S_2 \\ S_3 \\ S_4 \\ S_5 \\ S_6 \\ S_7 \\ S_8 \\ D_5 \\ D_6 \\ D_7 \\ D_8 \end{bmatrix}.$$

The matrix $W_{12\text{-}by\text{-}12}$ represents a 12-by-12 matrix, as tabulated below to be an example.

| | | | | | | | | | | | |
|---|---|---|---|---|---|---|---|---|---|---|---|
| 1 | 1 | 1 | 1 | 1 | 1 | 1 | 1 | 0 | 0 | 0 | 0 |
| 1 | -1 | 1 | -1 | 1 | -1 | 1 | -1 | 0 | 0 | 0 | 0 |
| 1 | 1 | -1 | -1 | 1 | 1 | -1 | -1 | 0 | 0 | 0 | 0 |
| 1 | -1 | -1 | 1 | 1 | -1 | -1 | 1 | 0 | 0 | 0 | 0 |
| 1 | 1 | 1 | 1 | -1 | -1 | -1 | -1 | -1 | 0 | 0 | 0 |
| 1 | -1 | 1 | -1 | -1 | 1 | -1 | 1 | 0 | -1 | 0 | 0 |
| 1 | 1 | -1 | -1 | -1 | -1 | 1 | 1 | 0 | 0 | -1 | 0 |
| 1 | -1 | -1 | 1 | -1 | 1 | 1 | -1 | 0 | 0 | 0 | -1 |
| 0 | 0 | 0 | 0 | 1 | 0 | 0 | 0 | 0 | 0 | 0 | 0 |
| 0 | 0 | 0 | 0 | 0 | 1 | 0 | 0 | 0 | 0 | 0 | 0 |
| 0 | 0 | 0 | 0 | 0 | 0 | 1 | 0 | 0 | 0 | 0 | 0 |
| 0 | 0 | 0 | 0 | 0 | 0 | 0 | 1 | 0 | 0 | 0 | 0 |

FIG. 8 represents one of the $(^4_2)=6$ cases in which two of the aggregated sites $2i+254$ and $2j+254$, $i,j \in \{i \neq j, i,j = 1, \ldots, 4\}$, are not available. When exactly two aggregated sites are missing, the post-retrieval processor 138 can reconstitute the 4 sets of data $S_1$, $S_2$, $S_3$ and $S_4$ by the remaining 2 aggregated sites, each of which is attached to established links $4k+218$ and $4k+236$ $k \neq i$, $k \neq j$. The post-retrieval processor 138 reconstitutes the 4 sets of data $S_1$, $S_2$, $S_3$ and $S_4$ by treating the four missing WFCs in the unavailable aggregated sites $2i+254$ and $2j+254$ as auxiliary unknown variables to be solved, given that $W_{12\text{-}by\text{-}12}$ is constructed properly.

Embodiment 9

Figure 9:
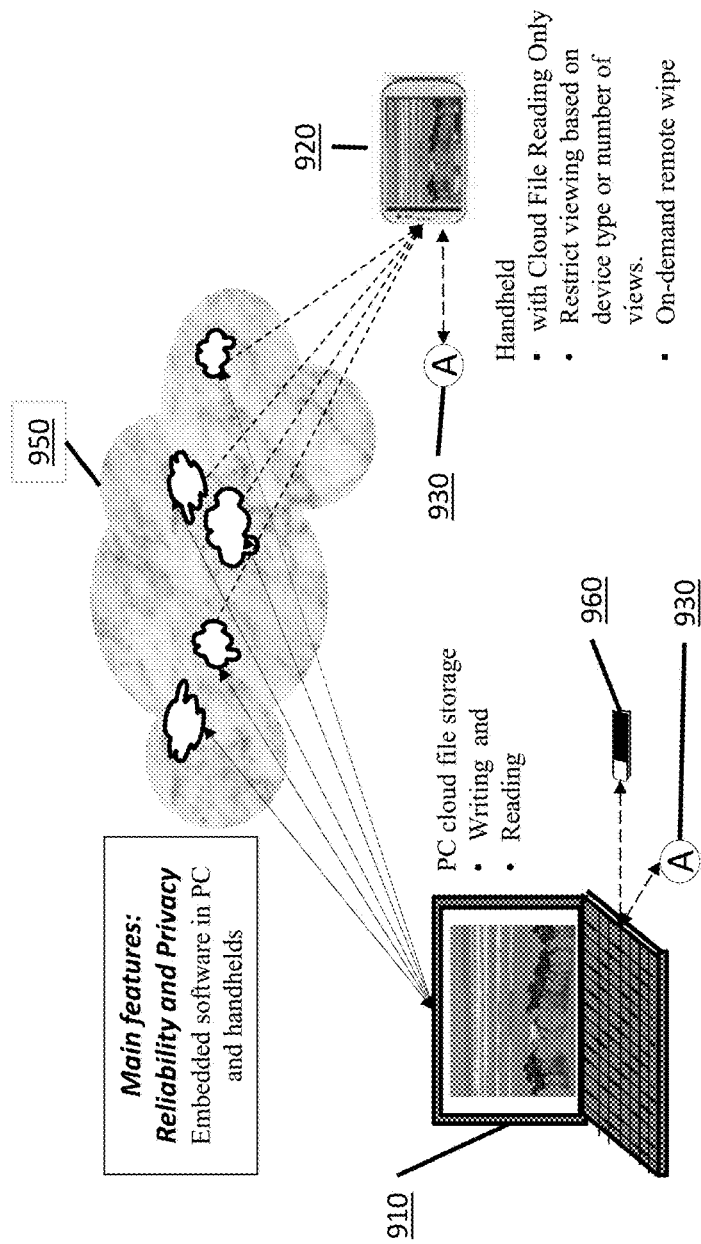
FIG. 9 depicts a scenario using WF muxing to store personalized data on cloud, in which a PC features capability of writing to and reading from cloud storage, and a mobile device with capability of reading only from distributed cloud storage.

FIG. 9 depicts a scenario using WF muxing to store personalized data on cloud. It takes advantages of many free storage spaces by various cloud storage operators. The WF muxing techniques effectively aggregate multiple small distributed storages to function as a large storage for a user with main features of Reliability and Privacy. The stored data via WF muxing may be configured to be accessible via Cloud from anywhere on earth at any time. For a user, a personal computer (PC) 910 at a home-base features capability of writing data to and reading data from cloud storage 950. We shall take advantages of "auto-synchronization" functions provided by many cloud storage venders. For writing or storing data to cloud 950 one may choose a large data file, which is segmented and then WF muxed into multiple WF-muxed sub-files. Let us assume there are 4 of them, each of which will be put to one of 4 local files in the PC 910 and be synchronized by 4 corresponding cloud storages operated by individual venders. The WF muxing may be configured such that any 3 of the 4 stored sub-files are sufficient to reconstitute the original data file via a corresponding WF demuxing processor in a "data reading" process either on a PC 910 at the home or a mobile device 920 with reading only capability anytime of a day and anywhere on earth. A handheld may be restricted with limited viewing based on device types and numbers of previous viewing. It may also be programmed to feature an on-demand remote wiping capability.

The database associated with the WF muxing/demuxing for the data storage on cloud and the manager of the stored database must be securely accessible and available to all the WF demuxing based data reading functions that reside in PCs and those in the handhelds. The secured accessibility may be results of transferring related database to personal devices such as USB memory sticks 960 or phones 920 connected to PC by wire, or via a wireless device 930 operated in a wireless format such as bluetooth.

In another embodiment, 4 separated and distributed storages on cloud 950 are used to save multiple data files. Supposed there are 3 different data files with comparable data sizes accessible to a PC 910. One may perform WF muxing on these 3 data files via a 4-to-4 WF muxing processor into 4 WF muxed files. Each output file featuring a weighted sum of the three data files will be put to one of 4 local files, which are to be synchronized by 4 corresponding storage venders via cloud. The WF muxing are configured that any 3 of the 4 stored WF muxed-files are sufficient to reconstitute any one of the 3 original data files via a corresponding WF demuxing processor in a "data reading" process either on a PC at a home or a mobile device 920 with capability of reading only from distributed cloud storage.

Furthermore, it is possible to add and store a fourth data file with the same data size by the same set of distributed cloud storage allocated for the 3 data files previously. One may perform WF muxing on these four (3+1) data files via a 4-to-4 WF muxing processor into 4 WF muxed files. Each output file featuring a weighted sum of the four original data files will be put to one of 4 local files, which are to be synchronized by 4 corresponding storage venders via cloud. The WF muxing are configured such that all 4 stored WF muxed-files are required to reconstitute any one of the 4 original data file via a corresponding WF demuxing processor in a "data reading" process.

In another embodiment, one may invoke a "data writing" process featuring WF muxing that transforms a file in the PC 910 to 8 WF muxed files and stores these WF muxed files to 4 corresponding cloud storages operated by individual venders. The WF muxing may be configured such that (1) any cloud storage stores at least one said WF muxed file, and (2) at least 4 out of the 8 stored WF muxed files are sufficient to reconstitute the original data file via a corresponding WF demuxing processor in a "data reading" process either on a PC 910 at the home or a mobile device 920 with reading only capability anytime of a day and anywhere on earth.

Embodiment 10

Figure 10:
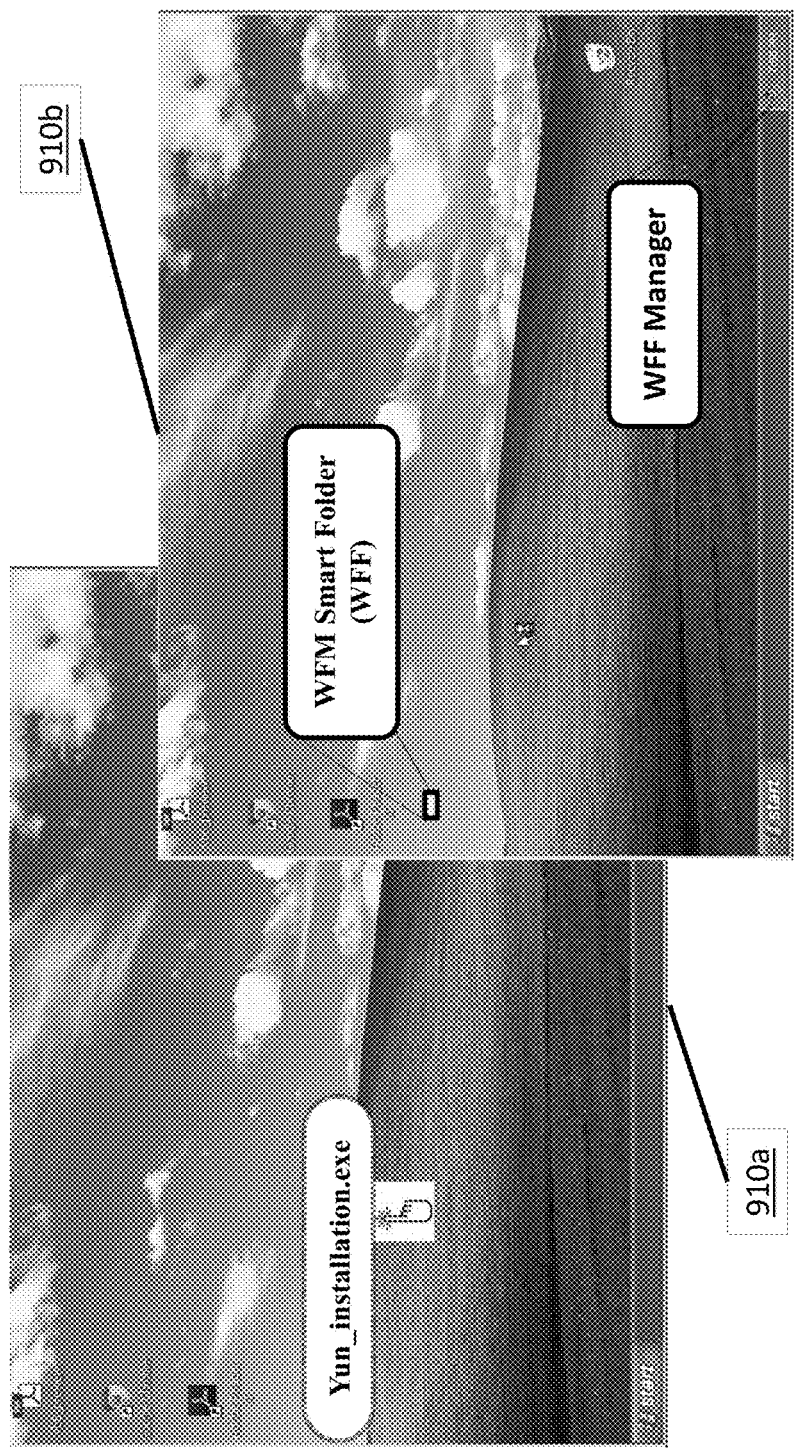
FIG. 10 depicts functions of a Wavefront Muxing Folder (WFF), and a manager for the WF Muxing Folder (WFF).

FIG. 10 depicts functions of a Wavefront Muxing Folder (WFF), and a manager for the WF Muxing Folder (WFF Manager). There are two screen shoots 910a and 910b from a PC. In the screen shot of 910a, an execution command (Yun_installation.exe) for a database software package embedded in a short cut has been clicked. As a result, two small icons for execution of short cuts appear on the second screen shot 910b; a WF muxing (smart) folder, WFF, and a WFF Manager.

The associated database comprises a collection of every file's information associated with a selected WF muxing configuration in a writer, and shall be referred to as a writing configuration. It includes: (1) file name, file location (path), and (2) associated wavefront component (WFC) in the outputs of the WF muxing; such as "yy1.mux" or "yy2.mux" as output file formats and their paths. The database must be synchronized between readers and writers. The synchronization may be via secured communications channels such as Bluetooth (private) between the home-based computers on one hand and laptop/mobile devices on the other hand. The transport/storage processing shall feature, in a default mode, automatic WF Muxing in file storage and automatic WF Demuxing in file retrieval.

The WFM Smart Folder (WFF) will (1) appear as a normal folder (e.g. a folder-shortcut on Desktop); (2)trigger functions upon file addition or file retrieval; and (3) run at front-end. On the other hand, the WFF Manager will serve as an interface for user to designate cloud folders (e.g. Google Drive, Dropbox, Skydrive, iCloud, etc), linking to WFF and running at back-end to monitor each cloud folder's usage. The WFF Manager may be minimized as a small icon in window's 'Toolbar' or 'Taskbar.'

REFERENCES

1. US patent Appl. Publication No. US20140081989 A1; "Wavefront Muxing and Demuxing for Cloud Data Storage and Transport," Published on Mar. 20, 2014
2. US Patent Appl. Publication No. 20110197740 A1, "Novel Karaoke and Multi-Channel Data Recording/Transmission Techniques via Wavefront Multiplexing and Demultiplexing," Published on Aug. 18, 2011

What is claimed is:

1. A computer-implemented method comprising[H]:
    transforming M input data sets concurrently into L wavefront components (WFCs) as output data sets via a wavefront muxing processor having M input ports and L output ports, where L and M are positive integers, L is greater than or equal to M; and
    storing the L WFCs to L data storages distributed in I locations in user's registered cloud space and L−I user's storage devices, I being a positive integer smaller than or equal to L,
    wherein the M input data sets and the L output data sets are connected to the M input ports and the L output ports, respectively,
    wherein each of the L WFCs is a linear combination of the M input data sets,
    wherein the transforming comprises outputting a first weighted sum of the M input data sets as a first output, and outputting a second weighted sum of the M input data sets as a second output,
    wherein a first input of the wavefront muxing processor contributes to a first aggregated numerical value of the first weighted sum, and contributes to a second aggregated numerical value of the second weighted sum, and
    wherein L−M corresponds to a degree of redundancy related to number of extra data sets.

2. The method of claim 1, further comprising segmenting one data stream into the M input data sets.

3. The method of claim 1 wherein at least one of the M input data sets is a known a priori data stream.

4. The method of claim 1 wherein at least one of the M input data sets is zero.

5. The method of claim 1, wherein the transforming comprises performing a mathematical function of an orthogonal matrix transform.

6. The method of claim 1, wherein the transforming comprises performing a Hadamard transform.

7. The method of claim 1, wherein the transforming comprises performing a Fourier transform.

8. The method of claim 1, wherein the transforming comprises performing a mathematical function of a non-orthogonal and full rank matrix transform.

9. A computer-implemented method comprising:
retrieving L wavefront components (WFCs) from L data storages distributed in I locations in user's registered cloud space and L–I user's storage devices, L and I being positive integers and I being smaller than or equal to L; and
transforming the retrieved L WFCs to M output data sets concurrently via a wavefront demuxing processor having L input ports and M output ports;
where M is a positive integer and L is greater than or equal to M,
wherein the retrieved L WFCs and the M output data sets are connected to the L input ports and the M output ports, respectively,
wherein each of the M output data sets is a linear combination of the retrieved L WFCs,
wherein the transforming comprises outputting a first weighted sum of the retrieved L WFCs as a first output, and outputting a second weighted sum of the retrieved L WFCs as a second output,
wherein a first input of said wavefront demuxing processor contributes to a first aggregated numerical value of the first weighted sum, and contributes to a second aggregated numerical value of the second weighted sum, and
wherein L–M corresponds to a degree of redundancy related to number of extra data sets.

10. The method of claim 9, further comprising de-segmenting the M output data sets into one output stream.

11. The method of claim 9 wherein at least one of the M output data sets corresponds to a known a priori data stream.

12. The method of claim 9 wherein at least one of the M output data sets corresponds to zero.

13. The method of claim 9, wherein the transforming comprises performing a mathematical function of an inverse orthogonal matrix transform.

14. The method of claim 9, wherein the transforming comprises performing an inverse Hadamard transform.

15. The method of claim 9, wherein the transforming comprises performing an inverse Fourier transform.

16. The method of claim 9, wherein the transforming comprises performing a mathematical function of an inverse non-orthogonal and full rank matrix transform.

\* \* \* \* \*